United States Patent [19]

Matsumoto et al.

[11] Patent Number: 5,532,984

[45] Date of Patent: Jul. 2, 1996

[54] HIGH RESOLUTION READ-ONLY MAGNETO-OPTICAL DISK AND METHOD AND APPARATUS FOR REPRODUCING INFORMATION THEREFROM

[75] Inventors: Hiroyuki Matsumoto, Tokyo; Tatsuo Niwa, Sakura, both of Japan

[73] Assignee: Nikon Corporation, Tokyo, Japan

[21] Appl. No.: 170,261

[22] PCT Filed: May 18, 1993

[86] PCT No.: PCT/JP93/00647

§ 371 Date: Dec. 28, 1993

§ 102(e) Date: Dec. 28, 1993

[87] PCT Pub. No.: WO93/23850

PCT Pub. Date: Nov. 25, 1993

[30] Foreign Application Priority Data

| May 19, 1992 | [JP] | Japan | 4-125246 |
| May 19, 1992 | [JP] | Japan | 4-125247 |
| Dec. 16, 1992 | [JP] | Japan | 4-336102 |
| Apr. 27, 1993 | [JP] | Japan | 5-100704 |

[51] Int. Cl.$^6$ .................. G11B 11/00; G11B 5/70
[52] U.S. Cl. .................. 369/13; 365/12.2; 428/694 ML
[58] Field of Search .................. 369/13, 14, 275.1, 369/275.2, 275.4, 110; 360/59, 114; 365/122; 428/694 ML, 694 MM, 694 EC

[56] References Cited

U.S. PATENT DOCUMENTS

| 5,030,512 | 7/1991 | Kato et al. | 428/694 ML |
| 5,168,482 | 12/1992 | Aratani et al. | 369/13 |
| 5,192,626 | 3/1993 | Sekiya et al. | 369/13 |
| 5,241,520 | 8/1993 | Ohta et al. | 369/13 |
| 5,265,074 | 11/1993 | Ohta et al. | 369/13 |

(List continued on next page.)

FOREIGN PATENT DOCUMENTS

| 0415449 | 3/1991 | European Pat. Off. |
| 4106744 | 4/1992 | European Pat. Off. |
| 474328 | 3/1992 | Japan |
| 4-255936 | 9/1992 | Japan |

(List continued on next page.)

OTHER PUBLICATIONS

Patent Abstracts Of Japan, vol. 16, No. 209 (P–1354), 18 May 1992 (JP A 4034744).
Patent Abstracts Of Japan, vol. 18, No. 184 (P–1719), 29 Mar. 1994 (JP A 5342650).
Patent Abstracts Of Japan, vol. 18, No. 14 (P–1672), 11 Jan. 1994) (JP A 5250741).
Patent Abstracts Of Japan, vol. 18, No. 189 (P–1721), 31 Mar. 1994 (JP A 5347036).
Patent Abstracts Of Japan, vol. 18, No. 42 (P–1680), 21 Jan. 1994 (JP A 5266523).

*Primary Examiner*—Georgia Y. Epps
*Assistant Examiner*—Tan Dinh
*Attorney, Agent, or Firm*—Shapiro and Shapiro

[57] ABSTRACT

A read-only magneto-optical disk comprises at least a substrate and a magnetic layer built up thereon. The magnetic layer has a track with a second micro region $\alpha_1$ (corresponding to a pit or mark) in which magnetization can be directed in a predetermined direction ↑ under spot irradiation of a reproduction laser and a first micro region $\alpha_0$ in which magnetization cannot be directed in the predetermined direction under the laser irradiation. Defining one of the micro regions as an information unit, information is expressed by presence or absence of the information unit, or by a length thereof. In a method and apparatus for reproducing from the disk, when the region $\alpha_1$ is located within a heat-storing region a in the irradiation spot, the coercivity therein drops, and the magnetization is directed in the predetermined direction ↑ under influence of an auxiliary magnetic field ↑ (as if heat-visualized). Magnetization is not directed in the predetermined direction ↑ in the region other than the region $\alpha_1$ in the spot. When the region $\alpha_0$ is located in the region a, the magnetization is not directed in the predetermined direction ↑ in any region in the spot. Therefore, existence of the region $\alpha_1$ smaller than the spot diameter can be detected.

31 Claims, 7 Drawing Sheets

U.S. PATENT DOCUMENTS

| | | | |
|---|---|---|---|
| 5,309,427 | 5/1994 | Matsumoto | 369/13 |
| 5,329,505 | 7/1994 | Ohtsuki | 369/13 |
| 5,329,512 | 7/1994 | Fukimoto et al. | 369/13 |
| 5,384,758 | 1/1995 | Matsumoto | 369/13 |
| 5,430,695 | 7/1995 | Matsumoto | 369/13 |

FOREIGN PATENT DOCUMENTS

| | | |
|---|---|---|
| 4-255945 | 9/1992 | Japan . |
| 4-258831 | 9/1992 | Japan . |
| 4-271039 | 9/1992 | Japan . |
| 4-355238 | 12/1992 | Japan . |
| 4-364254 | 12/1992 | Japan . |
| 4-366444 | 12/1992 | Japan . |
| 5-12673 | 1/1993 | Japan . |
| 5-12746 | 1/1993 | Japan . |
| 5-101471 | 4/1993 | Japan . |
| 5-109134 | 4/1993 | Japan . |
| 5-120751 | 5/1993 | Japan . |

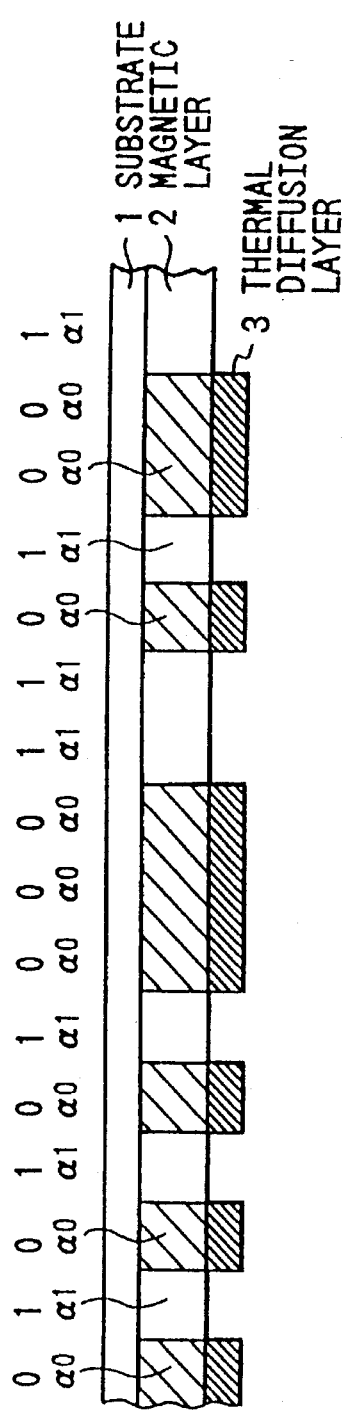
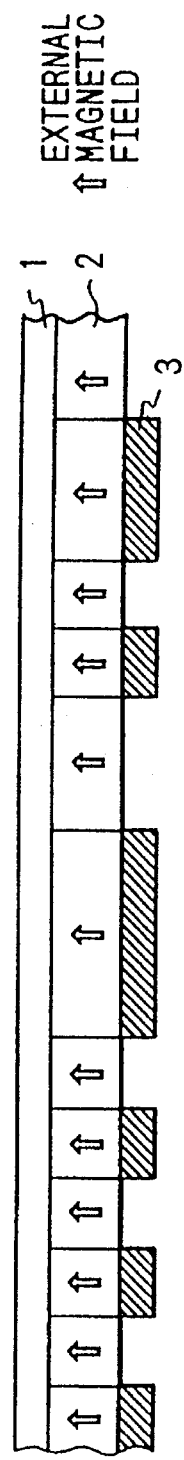
FIG. 4A
FIG. 4B

HIGH RESOLUTION READ-ONLY MAGNETO-OPTICAL DISK AND METHOD AND APPARATUS FOR REPRODUCING INFORMATION THEREFROM

TECHNICAL FIELD

The present invention relates to a novel magneto-optical disk for exclusive use of reproduction and to reproducing method and reproducing apparatus thereof.

BACKGROUND ART

Efforts are being made to develop an optical recording/reproducing method satisfying various requirements including a high density, a large capacity, a high access speed, and a high recording and reproducing speed together with a recording apparatus, a reproducing apparatus and a record medium used therein.

Among many sorts of optical recording/reproducing methods, a magneto-optical recording/reproducing method is most attractive because of a unique advantage that information can be recorded and then erased, and new information can be again recorded, which process can be repeated many times.

A magneto-optical disk (record medium) used in the magneto-optical recording/reproducing method has a magnetic layer composed of a layer or multiple layers for record storage. The magnetic layer used to be horizontal magnetic layer or layers (which are magnetized in parallel with the surface of layer) early disks. Then developed were perpendicular magnetic layer or layers having a high record density and a high signal intensity. The latter is used for almost 100% of magnetic layers at present. Such a magnetic layer is made for example of amorphous GdFe, GdCo, GdFeCo, TbFe, TbCo, TbFeCo, etc. The perpendicular magnetic layer generally has concentric tracks or spiral track, on which information is recorded. There are two types of tracks, i.e., explicit track and implicit track.

[Explicit Track]

If a disk has the explicit track(s), there are spiral or concentric tracks for recording information on the disk when the disk is seen along the direction normal to the surface of disk. A groove for tracking and separation exists between two adjacent tracks. A portion between two grooves is called a land. Actually, the relation between lands and grooves on the front surface of disk is reverse to that on the back surface of disk. When the disk is seen in the same direction as the beam incident direction, the far side is called a land and the near side a groove. Since the perpendicular magnetic layer is formed over the entire surface of the disk to cover grooves and lands, either the groove portion or the land portion can be used as tracks. There is no specific size regulation between groove width and land width.

To form such lands and grooves, a substrate generally includes lands formed in spiral or concentric shape on the surface thereof and grooves formed between adjacent lands. A thin perpendicular magnetic layer is formed on such a substrate. Thus, the perpendicular magnetic layer has lands and grooves.

[Implicit Track]

A disk having implicit tracks has no apparent tracks. The tracks are conceptual. In this case, recording apparatus or reproducing apparatus will have a control system, by which a laser beam (spot thereof) emitted from an optical head or pickup is controlled relatively to run (track) on the disk in a spiral or concentric trace. The trace of the spot's running is the implicit track(s). Alternatively, marks as described below are scattered along a track, and a belt line connecting the scattered marks may be considered as the implicit track(s).

[Mark]

In this specification, either one of "upward" and "downward" to the surface of layer is defined as "A direction" and the other as "inverse A direction". It should be understood that an example of "predetermined direction" stated in the present invention is the "A direction". Information to be recorded is preliminarily binarized, and the information is recorded using two signals of mark ($B_1$) having magnetization of "A direction" and mark ($B_0$) having magnetization of "inverse A direction". These marks $B_1$, $B_0$ respectively correspond to either one and the other of digital signals of 1 and 0. The magnetization of a track about to be recorded is normally aligned in the "inverse A direction" by applying a strong external magnetic field before recording. The operation of alignment of magnetization direction is called initialization. Then, marks ($B_1$) having magnetization of "A direction" are formed on tracks. Either a mark ($B_0$) or a mark ($B_1$) is a unit of information, and information is expressed by presence or absence of an information unit (normally of mark ($B_1$)) or by a length thereof. The methods for expressing information by length include the method for expressing information by edge position of mark (front edge and/or rear edge). The mark used to be called a pit or bit, but is recently called a mark. This mark corresponds to "first micro region $\alpha_0$" or "second micro region $\alpha_1$" in the present invention.

[Principle of Mark Formation]

The feature of laser, that is, the excellent coherence in respect of space and time, is advantageously used in mark formation, so that a beam is focused into as small a spot as the diffraction limit determined by a wavelength of laser beam. The thus focused beam is guided to irradiate the surface of a track, whereby information is recorded by forming a mark in diameter of not more than 1 μm in the perpendicular magnetic layer. The theoretically possible record density is about $10^8$ marks/cm$^2$ in optical recording. The reason is that a laser beam can be concentrated into a spot having as small diameter as the wavelength of beam.

As shown in FIG. 2, in magneto-optical recording, a laser beam (L) is focused on a magnetic layer (2), which is the perpendicular magnetic layer, to heat it. During the operation, a recording magnetic field (Hb) having a direction opposite to the initialization direction is applied to the heated portion from the outside. Then, the coercivity Hc decreases in the locally heated portion so as to be lower than the recording magnetic field (Hb). As a result, the magnetization in the heated portion is aligned in the direction of recording magnetic field. A mark magnetized in the reverse direction is formed accordingly.

[Principle of Reproduction]

FIG. 3 shows the principle of information reproduction based on the magneto-optical effect. A light beam is an electromagnetic wave having an electromagnetic field vector normally diverging in all directions on the surface normal to the optical path. After light from a light source is linearly polarized (as $L_P$), it then enters the magnetic layer (2). The magnetic layer (2) reflects at surface thereof or transmits the light. The plane of polarization of the light is rotated according to the direction of magnetization M. In case that the magnetic layer is made of a heavy rare earth-transition metal alloy, the rotation principally depends on the direction of sub-lattice magnetization of transition metal. The phenomenon of rotation is known as the magnetic Kerr effect or magnetic Faraday effect.

For example, if the plane of polarization of the reflected light is rotated by $\theta_K$ degrees for magnetization of "A direction", it is rotated by $-\theta_K$ degrees for magnetization of "inverse A direction". Thus, if an optical analyzer (polarizer) is set so that the axis thereof is perpendicular to the plane inclined at $-\theta_K$ degrees, the analyzer transmits no light reflected from a mark ($B_0$) magnetized in the "inverse A direction". In contrast, the analyzer transmits light reflected from a mark ($B_1$) magnetized in the "A direction" while multiplying its magnitude by $(\sin 2\theta_k)^2$, and the transmitted light is received by a detector (photoelectric conversion means). As a result, the mark ($B_1$) magnetized in "A direction" is observed brighter than the mark ($B_0$) magnetized in the "inverse A direction", so as to cause the detector to produce a stronger electric signal. Accordingly, the electric signal from the detector is modulated according to the recorded information, permitting information reproduction. The analyzer and the detector constitute magneto-optical processing means. In addition to the direct method in which a polarizer is simply used as an analyzer, there is the differential method, in which a polarization beam splitter (PBS) is used as an analyzer to decompose the incident light into two components, the two decomposed light beams are converted into electric signals by detectors, respectively, and a differential between two signals is obtained by a differential (amplifying) circuit (i.e., the difference is used as a reproduction signal). In this method, the PBS, the two detectors and the differential (amplifying) circuit constitute the optical processing means.

[TM and RE]

The magnetic layer (preferably, the perpendicular magnetic layer) is preferably made of an amorphous ferrimagnetic material selected from alloys between transition metal (as will be abbreviated as TM) and heavy rare earth metal (as will be abbreviated as RE). Examples of TM are Fe and Co while examples of RE are Gd, Tb, Dy, and Ho. Direction and magnitude of magnetization appearing outside an alloy are determined by the relations between direction and magnitude of sub-lattice magnetization of TM and direction and magnitude of sub-lattice magnetization of RE inside the alloy. The magnetization of alloy is a sum of a TM sub-lattice magnetization vector and a RE sub-lattice magnetization vector. However, the directions of the vectors are always opposite to each other inside the alloy because of the interaction between TM sub-lattice magnetization and RE sub-lattice magnetization. Therefore, if the magnitude of TM sub-lattice magnetization vector is equal to that of RE sub-lattice magnetization vector, the vector of alloy is zero (which means that the magnitude of magnetization appearing outside the alloy is zero). An alloy composition to make the vector of alloy zero at room temperature is called a compensation composition. In compositions other than the compensation composition, an alloy shows magnetization with a magnitude equal to a difference of magnitude between the two sub-lattice magnetizations and a direction equal to a direction of greater vector. Since the aforementioned Kerr effect and Faraday effect principally depend on the direction of TM sub-lattice magnetization vector, no change will be seen in the Kerr effect or in the Faraday effect at temperatures over Tcomp.

If one of TM vector and RE vector has a greater magnitude than the other in an alloy composition, the alloy composition is called as TM rich or RE rich according to the with name of the greater magnitude vector. The direction of magnetization of the whole alloy is coincident with an direction of sub-lattice magnetization of oo in oo rich. The intensity of sub-lattice magnetization changes with temperature change. If the two vectors have a same magnitude at a temperature, the temperature is called as compensation temperature Tcomp. The composition changes from TM rich to RE rich at the border of this temperature, or otherwise.

The conventional magneto-optical disks had a limit of record density, and therefore had a problem that the record capacity cannot be increased over a certain limit value. The reason is that marks smaller than the spot diameter of laser beam cannot be reproduced.

The present invention solves the foregoing problem.

SUMMARY OF THE INVENTION

The present invention provides the following:

(1) A magneto-optical disk for exclusive use of reproduction comprising at least a substrate and a magnetic layer built up thereon, wherein a second micro region $\alpha_1$ in which magnetization is directed under irradiation of laser beam for reproduction in a predetermined direction and a first micro region $\alpha_0$ in which magnetization is not directed under irradiation of laser beam for reproduction in the predetermined direction are formed along a track in said magnetic layer and wherein, defining one of said micro regions as an information unit, information is expressed by presence or absence of the information unit or by a length thereof.

(2) A magneto-optical disk for exclusive use of reproduction comprising at least a substrate and a magnetic layer built up thereon, wherein a first micro region $\alpha_0$ on which a thermal diffusion layer is provided adjacent thereto and a second micro region $\alpha_1$ on which said thermal diffusion layer is not provided are formed along a track in said magnetic layer and wherein, defining one of said micro regions as an information unit, information is expressed by presence or absence of the information unit or by a length thereof.

(3) A magneto-optical disk for exclusive use of reproduction comprising at least a substrate and a magnetic layer built up thereon, wherein a second micro region $\alpha_1$ on which a thermal shield layer is provided adjacent thereto and a first micro region $\alpha_0$ on which said thermal shield layer is not provided are formed along a track in said magnetic layer and wherein, defining one of said micro regions as an information unit, information is expressed by presence or absence of the information unit or by a length thereof.

(4) A magneto-optical disk for exclusive use of reproduction according to (3), wherein a thermal diffusion layer is provided on said magnetic layer in the first micro region $\alpha_0$ on which said thermal shield layer is not provided.

(5) A magneto-optical disk for exclusive use of reproduction according to (2) or (4), wherein a thermal conductivity of a material of which said thermal diffusion layer is made is not less than 50 [W/m•K].

(6) A magneto-optical disk for exclusive use of reproduction according to (2) or (4), wherein a specific heat of a material of which said thermal diffusion layer is made is greater than 0.2 [J/g•K].

(7) A magneto-optical disk for exclusive use of reproduction according to (3) or (4), wherein said thermal diffusion layer is a diamond thin layer.

(8) A magneto-optical disk for exclusive use of reproduction according to (7), wherein a thickness of said diamond thin layer is not less than 500 Å.

(9) A magneto-optical disk for exclusive use of reproduction according to (3) or (4), wherein a thermal conductivity of a material of which said thermal shield layer is made is not more than 4 [W/m•K].

(10) A magneto-optical disk for exclusive use of reproduction according to any one of (1)–(4), wherein said magnetic layer has perpendicular magnetic anisotropy.

(11) A magneto-optical disk for exclusive use of reproduction according to any one of (1)–(4) or (10), wherein a coercivity of said magnetic layer is not more than 4 [kOe].

(12) A magneto-optical disk for exclusive use of reproduction according to any one of (1)–(4) or (10) or (11), wherein a compensation temperature of said magnetic layer is not less than room temperature and not more than a Curie point thereof.

(13) A magneto-optical disk for exclusive use of reproduction according to any one of (1)–(4) or (10) or (11), wherein when said magnetic layer locally reaches a predetermined high temperature $T_R$ by heat storage effect under irradiation of laser beam for reproduction, a compensation temperature of said magnetic layer is not less than room temperature, not more than said high temperature $T_R$, and not more than a Curie point thereof.

(14) A magneto-optical disk for exclusive use of reproduction according to any one of (1)–(4) or (10) or (11), wherein a compensation temperature of said magnetic layer is not less than room temperature and not more than 200° C.

(15) A magneto-optical disk for exclusive use of reproduction according to any one of (1)–(4) or any one of (11)–(14), wherein said magnetic layer is made of GdFeCo or GdTbFeCo or GdDyFeCo.

(16) A magneto-optical disk for exclusive use of reproduction according to any one of (1)–(4) or any one of (11)–(15), wherein said magnetic layer is composed of at least two layers arranged in order in an irradiation direction of the laser beam, the first layer having a relatively high Curie point and the second layer having a relatively low Curie point, and wherein the two layers are exchange-coupled with each other in substantially the entire contact region.

(17) A magneto-optical reproducing method comprising:
a first step of preparing a magneto-optical disk as set forth in any of (1)–(16), in which, if a direction of magnetization in said first micro region $\alpha_0$ and a direction of magnetization in the second micro region $\alpha_1$ are different from each other, they are made aligned with each other;
a second step of rotating said disk to irradiate the disk along a track with a laser beam for reproduction, thereby producing a local region at a predetermined high temperature $T_R$ on the track located within a spot diameter of said beam by effective heat storage effect, whereby when the second micro region $\alpha_1$ is located in said region at the high temperature $T_R$ magnetization thereof is directed in a predetermined direction, while when the first micro region $\alpha_0$ is located at the same position as said region at the high temperature $T_R$ magnetization thereof is not directed in the predetermined direction; and
a third step of optically processing reflected light which is the laser beam reflected in said spot diameter from the disk or transmitted light which is the laser beam transmitted in said spot diameter through the disk, to convert it into an electric signal.

(18) A reproducing apparatus of a magneto-optical disk for exclusive use of reproduction as set forth in any one of (1)–(16), comprising: disk rotating means, a laser beam source, an irradiation optical system for irradiating said disk with a laser beam from said beam source, auxiliary magnetic field applying means for helping to direct magnetization of a second micro region $\alpha_1$ in a predetermined direction when irradiated by said laser beam, a processing optical system for guiding reflected light which is said laser beam reflected from the disk or transmitted light which is the laser beam transmitted through the disk, to following optical processing means, and the optical processing means.

(19) A reproducing apparatus of a magneto-optical disk for exclusive use of reproduction according to (18), further comprising external magnetic field applying means for aligning directions of magnetization in the first micro region $\alpha_0$ and in the second micro region $\alpha_1$ in said disk.

(20) A reproducing apparatus of a magneto-optical disk for exclusive use of reproduction according to any one of (1)–(16), comprising: disk rotating means, a laser beam source, an irradiation optical system for irradiating said disk with a laser beam from said beam source, external magnetic field applying means for aligning directions of magnetization in a first micro region $\alpha_0$ and in a second micro region $\alpha_1$ in said disk, a processing optical system for guiding reflected light which is said laser beam reflected from the disk or transmitted light which is the laser beam transmitted through the disk, to following optical processing means, and the optical processing means.

A principle of the present invention will be described referring to FIGS. 1A and 1B (collectively referred to as FIG. 1) and the disk according to (1). The magnetic layer is formed as a perpendicular magnetic layer. Accordingly, "predetermined direction" means "A direction" for purposes of this discussion.

FIG. 1A is a conceptual drawing to show a portion of vertical cross section of disk and FIG. 1B is a conceptual drawing to show a portion of disk in plan view. The disk is comprised at least of a substrate (1) and a magnetic layer (2) layered thereon. Second micro regions $\alpha_1$ are scattered along a track (T) in the magnetic layer (2) and first micro regions $\alpha_0$ reside between them. Namely, a track is composed of regions $\alpha_1$ and $\alpha_0$ alternately arranged. A region $\alpha_1$ or $\alpha_0$ in minimum size is smaller than the diameter of a circular spot (SP) of a laser beam (L) for reproduction, as shown in in FIG. 1B. The spot of laser beam, which is incident from an objective (O), includes two minimum $\alpha_1$ and two minimum $\alpha_0$ in the example as shown. In this example, minimum $\alpha_1$ and minimum $\alpha_0$ are arranged in the order of $\alpha_0$, $\alpha_1$, $\alpha_0$, $\alpha_1$ from left to right in FIG. 1. No conventional techniques can permit information reproduction with specifying the order.

The magnetization in the magnetic layer is aligned for example in the "A direction".

In the example of FIG. 1, the spot moves from left to right so that the magnetic layer will have been exposed to light longer when at the left (rear) end in the spot circle, where thermal energy is stored. This is called a heat storage effect. Consequently, there is formed a local heat-storing region a as hatched at the left (rear) end in spot circle. If the heat dissipation condition is constant in the region a, the entire region a reaches a high temperature $T_R$. In case that a second micro region $\alpha_1$ is located in the heat-storing region a, the coercivity therein decreases. An auxiliary magnetic field stronger than the decreased coercivity is applied to the region. Then, only magnetization of $\alpha_1$ in the heat-storing region a is 10 inverted into the "inverse A direction". As a result, a reflected light component from $\alpha_1$ or a transmitted light component by $\alpha_1$ is made different in rotation of plane of polarization from other regions (in which the direction of magnetization is not inverted but entirely kept in the "A direction") because of the Kerr effect or the Faraday effect. Thus, polarization components will be different as compared with a case in which the entire area in spot circle has the same magnetization direction (i.e., there is no local region inverted into the "inverse A direction").

This changes an electric signal through (magneto) optical processing means, which results in detecting (reproducing) $\alpha_1$. The high temperature $T_R$ of course must be lower than the Curie point. Otherwise, the Kerr effect or the Faraday effect cannot be observed.

On the other hand, in case that a first micro region $\alpha_0$ is located in the heat-storing region a, the direction of magnetization in the entire region in spot circle is identical in the "A direction", because a material for $\alpha_0$ is one which does not cause the inversion of magnetization direction. Namely, there is no local region inverted into the "inverse A direction". As described, a second micro region $\alpha_1$ (corresponding to a mark) smaller than the spot diameter is detected (reproduced). This process can be readily understood by considering that only the second micro region $\alpha_1$ is "heat-visualized" in a portion in spot.

The present invention is also effective to arrangements in which a track is formed of a same magnetic material. For example, a thermal diffusion layer is provided adjacent to the upper layer or the lower layer of magnetic layer directly or through a third layer, as shown in FIGS. 4A and 4B (collectively referred to as FIG. 4. In this arrangement, regions of thermal diffusion layer (3) are scattered along a track. In this arrangement, there are first micro regions $\alpha_0$ which the thermal diffusion layer adjoins and second micro regions of which the thermal diffusion layer does not adjoin, arranged along a track. Also in this case, a portion at the rear end in the laser spot will have been irradiated with light for longer time so as to form a heat-storing region a, as shown in FIG. 5. It should be noted, however, that circumstances are different between case that a first micro region $\alpha_0$ adjoining the thermal diffusion layer is located in the heat-storing region a and a case that a second micro region $\alpha_1$ not adjoining the thermal diffusion layer is located in the region a.

When a second micro region $\alpha_1$ is located in the region a, the heat storage effect is effective to function, because there is no thermal diffusion layer adjacent to $\alpha_1$. Thus, a temperature at $\alpha_1$ exceeds the high temperature $T_R$. Then, the coercivity decreases, and the magnetization in $\alpha_1$ is inverted into the "inverse A direction" upon application of an auxiliary magnetic field stronger than the decreased coercivity. Even in the same spot, the magnetization in the portion other than the heat-storing region a is kept in the original "A direction".

On the other hand, when a first micro region $\alpha_0$ is located in the heat-storing region a, the heat storage effect is not effective to function, because the thermal diffusion layer is adjacent to $\alpha_0$. Thus, the region $\alpha_0$ does not reach the high temperature $T_R$. Then, the coercivity hardly decreases, so that the direction of magnetization in $\alpha_1$ is not inverted when the auxiliary magnetic field as described is applied thereto, because the auxiliary magnetic field is weaker than the coercivity. Namely, the entire region in the spot circle is kept in the magnetization of "A direction". The auxiliary magnetic field is always applied during reproduction. The reason is that the auxiliary magnetic field cannot be turned on and off or intensity-modulated corresponding to $\alpha_0$, since there is no means which can detect $\alpha_0$.

As described above, the second micro region $\alpha_1$ (corresponding to a mark) smaller than the spot diameter can be detected (reproduced). This process can be readily understood by considering that only the second micro region $\alpha_1$ is "heat-visualized" in a portion within spot.

In case that the direction of magnetization is disturbed before reproduction (though the direction of magnetization in magnetic layer (2) is omitted in in FIG. 4A), an external magnetic field stronger than the coercivity should be preferably applied as preliminary treatment to align the direction of magnetization in magnetic layer in one direction of "A direction". This state is shown in FIG. 4B. The direction of magnetization in the disk could be disturbed by every reproduction. The disk of the present invention can be repetitively subjected to the aforementioned preliminary treatment and then to reproduction after the preliminary treatment.

A thermal shield layer may be employed instead of the thermal diffusion layer. In this case, a micro region which the thermal shield layer does not adjoin is a first micro region $\alpha_0$ while a micro region which the thermal shield layer adjoins is a second micro region $\alpha_1$. The heat-storing region a is formed at the rear end in the laser spot. If a second micro region $\alpha_1$ adjacent to the thermal shield layer is located within the heat-storing region a, the heat storage effect is effective to function. Thus, a temperature in $\alpha_1$ exceeds the high temperature $T_R$. Then, the coercivity decreases, and an auxiliary magnetic field stronger than the decreased coercivity is applied. By this, the magnetization in $\alpha_1$ is inverted into the "inverse A direction". Even in the same spot circle, the portion other than the heat-storing region a is kept in the magnetization of original "A direction".

On the other hand, when a first micro region $\alpha_0$ is located in the heat-storing region a, the heat storage effect is not effective to function, because the thermal shield layer is not adjacent to the region. Thus, the region $\alpha_0$ does not reach the high temperature $T_R$. Then, the coercivity hardly decreases, so that the direction of magnetization in $\alpha_1$ is not inverted when the auxiliary magnetic field as described is applied to the region, because the auxiliary magnetic field is weaker than the coercivity. Namely, the entire region in the spot circle is kept in the magnetization of "A direction".

As described above, the second micro region $\alpha_1$ (corresponding to a mark) smaller than the spot circle can be detected (reproduced). This process can be readily understood by considering that only the second micro region $\alpha_1$ is "heat-visualized" in a portion in spot.

For the following reason, it is preferable that the magnetic layer has a compensation temperature between the room temperature and a Curie point thereof. It is presently difficult to concentrate the magnetic field within a small region of about 1 μm. When an auxiliary magnetic field is applied to the portion of magnetic layer illuminated by a spot, the auxiliary magnetic field is also applied to the magnetic layer surrounding the illuminated portion. While auxiliary magnetic field applying means is located in the vicinity of spot position, the disk is rotated. Then, if the auxiliary magnetic field is directed in the "A direction" for example, the auxiliary magnetic field aligns the magnetization in the "A direction" in the magnetic layer before the magnetic layer is illuminated by the spot. After that, the disk moves to be illuminated by the spot, and the temperature in magnetic layer increases to exceed the compensation temperature. This inverts the direction of magnetization in the magnetic layer in spot into the "inverse A direction". When the disk further moves to locate the magnetic layer in the heat-storing region a and if the heat storage effect is effective to function, the temperature in magnetic layer exceeds the high temperature $T_R$. Because of this, the coercivity there further decreases, so that the auxiliary magnetic field in the "A direction" again inverts the magnetic layer of high temperature $T_R$ into the "A direction".

[Structure of Disk]

The magnetic layer may be thin and normally is formed on a disk substrate (for example, glass or plastic substrate). The substrate may have grooves as a guide for tracking. Even if no groove is provided, the regions $\alpha_0$ or $\alpha_1$ are formed in a track, which can be the guide for tracking.

The magnetic layer is formed on the substrate by a vacuum thin film forming technique such as vacuum deposition and sputtering. Materials for magnetic layer are preferably transition metal-heavy rare earth alloys. The magnetic layer is preferably a perpendicular magnetic layer, but may be a horizontal magnetic layer. The thickness of magnetic layer is generally 100–1000 Å.

A predetermined pattern must be formed according to desired information to form the regions $\alpha_0$, $\alpha_1$ along a track of the magnetic layer. The pattern formation is carried out using photolithography. A photoresist is applied onto the evenly formed magnetic layer, and the resist is irradiated by a beam in the predetermined pattern or in the inverted pattern thereof. If the minimum regions $\alpha_0$ or $\alpha_1$ are desired to form as small as possible in order to increase the record density thereby, a beam having as short wavelength as possible must be used. The beam may be an electron beam, X-ray, ultraviolet ray, radioactive ray, etc. in addition to visible light. Using such rays, regions $\alpha_0$, $\alpha_1$ having a length of about 0.2–0.4 μm can be formed even by the current techniques. The length is far smaller than the minimum region of about 1 μm which can be reproduced by the wavelength (830 nm) of semiconductor laser presently used in LD or in CD.

After the irradiation, the resist is developed to obtain the pattern. The etching of the magnetic layer is next carried out. The etching removes the portion of magnetic layer which is not covered by the resist. After that, the finally remaining resist is removed, for example by ashing. Consequently, the magnetic layer is obtained with the predetermined pattern formed therein (as regions $\alpha_0$, $\alpha_1$ or precursors thereof are alternately arranged along track).

If the magnetic layer is formed of two different kinds of materials, one for region $\alpha_0$ and the other for region $\alpha_1$, a disk may be produced for example in the following process.

After the etching of a first magnetic layer is carried out in the above method, a second magnetic layer is built up thereon without removing the finally remaining resist. After that, the second magnetic layer above the finally remaining resist is removed together with the undercoat resist by lift-off. If desired, direct pattern formation could be carried out using the technique of laser marking after the first magnetic layer is evenly formed.

In case that the thermal diffusion layer or the thermal shield layer is provided to adjoin the magnetic layer, it can be also formed by the vacuum thin film forming technique. Materials for thermal diffusion layer are preferably those having a thermal conductivity of not less than 50 [W/m•K] or a specific heat of greater than 0.2 [J/g•K]. Such materials are for example non-magnetic metals such as Al, Cu, Ge, etc., and diamond. Materials for thermal shield layer are those having a thermal conductivity of not more than 4 [W/m•K]. Such materials are for example inorganic nitrides, inorganic oxides and inorganic carbides such as GeN, SiN, $SiO_2$, SiO, $Al_2O_3$, $TiO_2$, and SiC. The thickness of thermal diffusion layer or thermal shield layer may be generally 100–1000 Å. The thermal diffusion layer or the thermal shield layer must be formed in a predetermined pattern according to desired information to form the regions $\alpha_0$ or $\alpha_1$ along track. The method of pattern formation is as described above. If desired, direct pattern formation using the technique of laser marking may be employed after the thermal diffusion layer or the thermal shield layer is evenly formed. The thermal diffusion layer and the thermal shield layer may be alternately formed along track. A portion of magnetic layer adjacent to the thermal diffusion layer will be a first micro region $\alpha_0$ while a portion of magnetic layer adjacent to the thermal shield layer a second micro region $\alpha_1$. In this case, such a modification is possible that either one of the thermal diffusion layer and the thermal shield layer is evenly formed, the other layer is scattered along track thereon, and then the magnetic layer is uniformly formed over the layers.

Pattern formation of diamond thin film may be carried out such that a diamond thin film is evenly formed, an ArF excimer laser beam irradiates the film in a predetermined pattern in oxygen atmosphere, and the diamond thin film is subjected to etching with oxygen. The portion of diamond thin film irradiated by the laser beam is removed by the etching. As a result, the diamond thin film has the predetermined pattern. Here, the diamond thin film includes all called as diamond-like thin film, diamond-like carbon thin film.

BRIEF DESCRIPTION OF THE DRAWINGS

FIGS. 4A and 4B are conceptual drawings each showing a vertical cross section of a disk in another embodiment of the present invention.

EXAMPLES

The present invention will be described in detail by way of the following examples, but it should be understood that the present invention is not limited to the examples.

Figures 1A, 1B:
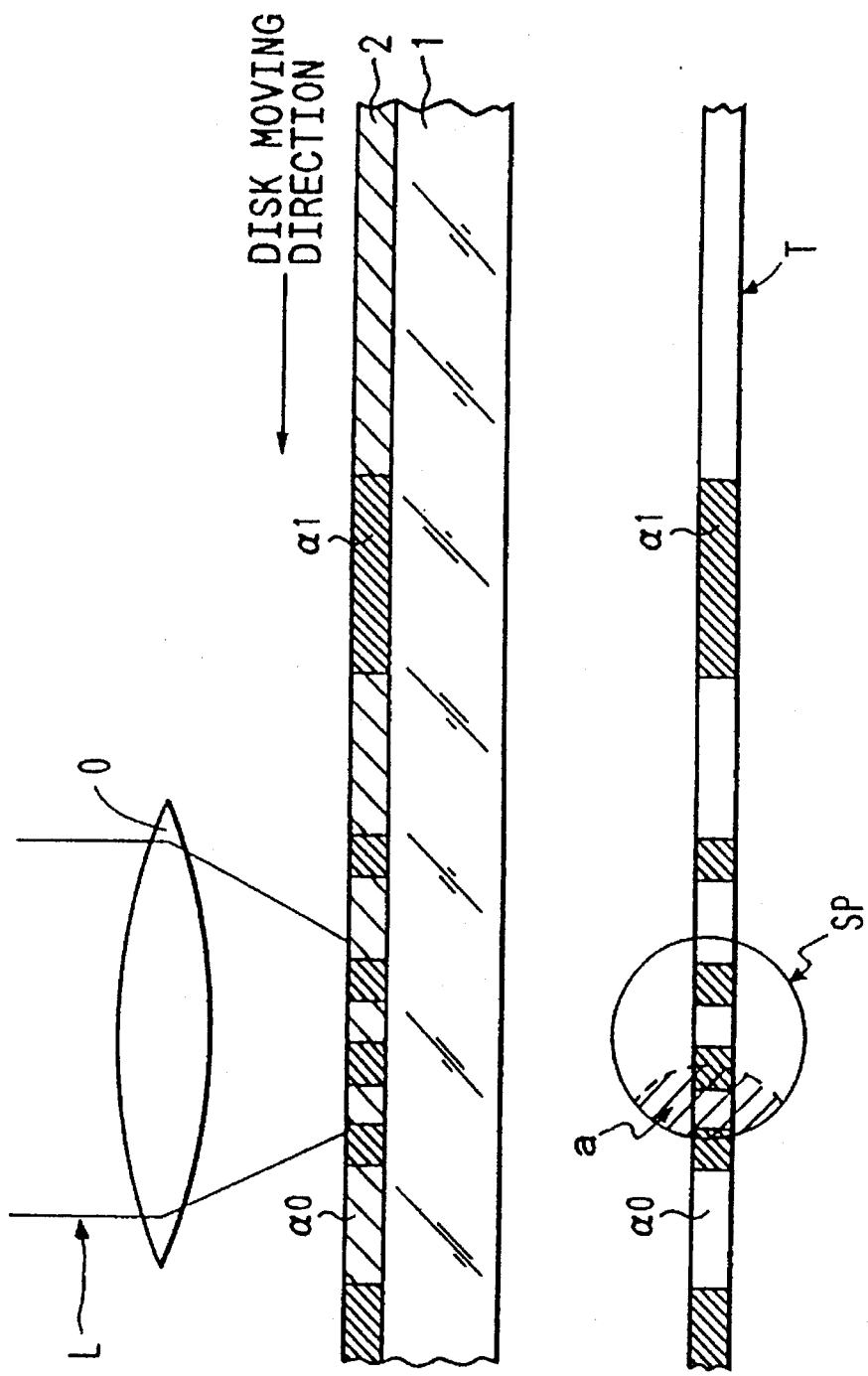
FIGS. 1A and 1B are conceptual drawings showing, respectively, a vertical cross section of a disk in an embodiment of the present invention and a top plan view thereof.
Figure 2:
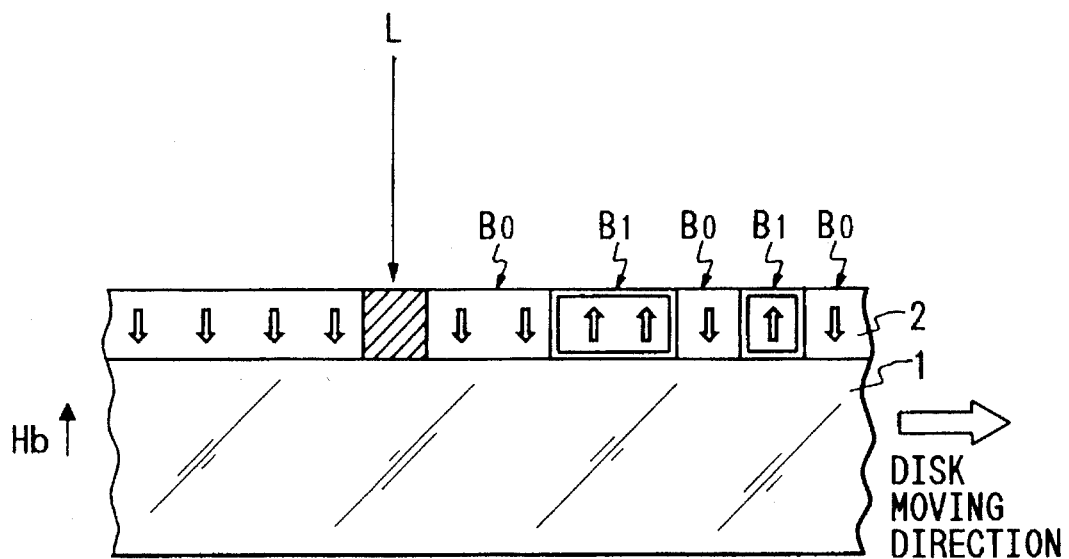
FIG. 2 is a conceptual drawing to illustrate the principle of recording in the magneto-optical recording method.
Figure 3:
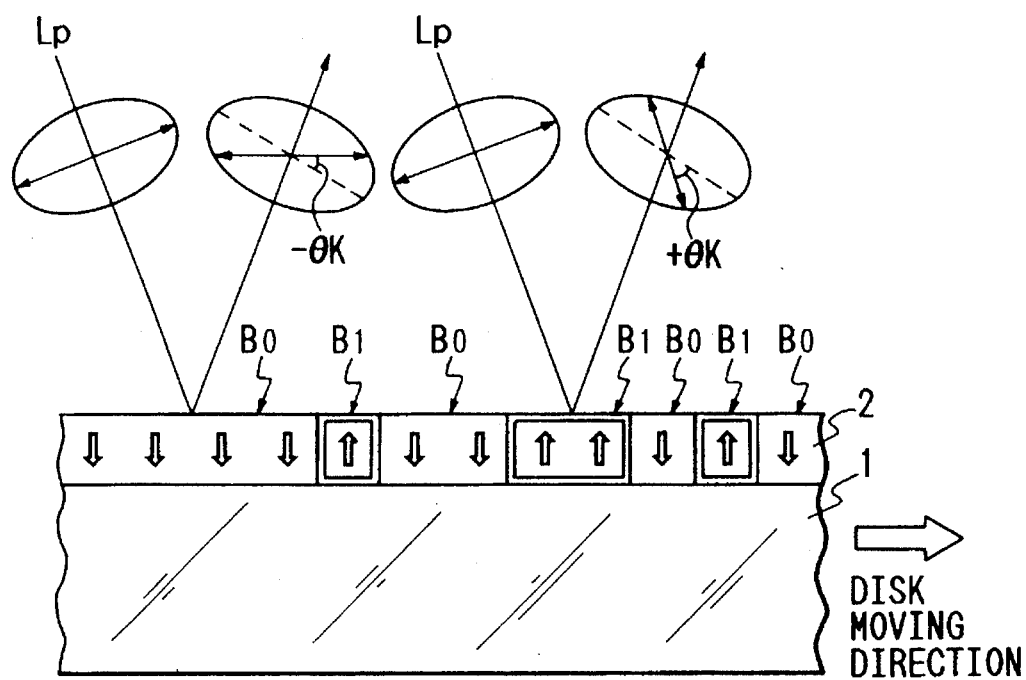
FIG. 3 is a conceptual drawing to illustrate the principle of reproduction in the magneto-optical recording method.

[Example 1] (disk: see FIG. 1)

(1) Prepared was a 2P substrate (diameter=130 mm) on which many grooves of depth h=700 Å and width w=0.6 µm are concentrically formed at pitch of 1.6 µm. Regions between the grooves are called lands, and the lands correspond to tracks.

(2) A first magnetic layer (Curie point Tc=250° C. and coercivity at 100° C. Hc=100 Oe) was first formed in thickness of 300 Å on the substrate. After that, holes were made as scattered along the tracks in the first magnetic layer by the photolithography (wavelength of exposure laser beam λ=248 nm: the laser was modulated by a predetermined frequency) and etching technique. At this occasion the resist was left. The holes had a size of width of 0.6 µm and length of 0.3 µm, and a distance was 0.3 µm between two holes. The holes correspond to the second micro regions $\alpha_1$ while spaces between holes to the first micro regions $\alpha_0$.

(3) A second magnetic layer (Curie point Tc=350° C. and coercivity at 100° C. Hc=1 kOe) was then layered in thickness of 300 Å. After that, the second magnetic layer residing on the first magnetic layer was removed by the lift-off method. A magneto-optical disk as shown in FIG. 1 was thus obtained by the above process. In this example, the regions $\alpha_0$ are formed of the first magnetic layer while the regions $\alpha_1$ of the second magnetic layer.

[Example 2] (reproduction)

(1) While the disk in Example 1 is rotated, the direction of magnetization in the first and second magnetic layers is aligned in the "A direction" by means for applying an external magnetic field of 5 kOe.

(2) The rotating disk is irradiated by a reproduction laser beam (wavelength λ=780 nm). The beam illuminates a track while forming a spot in diameter of 1 µm on the track. An auxiliary magnetic field of 200 Oe in the "inverse A direction" is applied to a position of the spot.

A portion in the spot forms the heat-storing region a by the heat storage effect, where the temperature exceeds the high temperature $T_R$=100° C. Therefore, if a first magnetic layer or first micro region $\alpha_0$ is located there, the coercivity Hc drops to 100 Oe, so that the magnetization in $\alpha_0$ is inverted into the "inverse A direction". In contrast, the portion except for the region a in the spot has a temperature lower than $T_R$=100° C. and keeps the sufficiently high coercivity, so the magnetization is not inverted into the "inverse A direction" by the auxiliary magnetic field. Therefore, polarization components of reflected light from the spot include rotation of +θk due to the partial magnetization in the "inverse A direction" and rotation of −θk due to the remaining magnetization in the "A direction". This is called a first state, for example.

If a second magnetic layer or second micro region $\alpha_1$ is located in the heat-storing region a, the coercivity Hc is kept as high as 1 kOe, and therefore the magnetization in $\alpha_1$ will never be inverted into the "inverse A direction". The portion except for the region a in the spot of course has a temperature lower than $T_R$=100° C. and therefore keeps a sufficiently high coercivity, so the magnetization will never be inverted into the "inverse A direction" by the auxiliary magnetic field. Therefore, all polarization components of reflected light from the spot include the rotation of +θk due to the magnetization in the "inverse A direction". This is called a second state, for example.

After the reflected light is guided to pass through an analyzer and converted into an electric signal by a detector, the first state or the second state may be identified by the strength of electric signal. Accordingly, whether a first micro region $\alpha_0$ comes into the heat-storing region a far smaller than the spot or not can be detected as a strong electric signal or as a weak electric signal.

[Example 3] (disk with thermal diffusion layer: see FIG. 4)

(1) A 2P substrate in Example 1 was prepared.

(2) An RF magnetron sputtering system was prepared, and the 2P substrate and various targets were set in a chamber of the system. Once the chamber was evacuated to the degree of vacuum of not more than 7×10$^{-7}$ Torr, Ar gas was introduced up to 5×10$^{-3}$ Torr.

Reactive sputtering was first carried out, using a Si target and introducing N$_2$ gas into the chamber in addition to the Ar gas, to form silicon nitride (first protective layer not shown) in thickness of 700 Å on a resin layer.

Then, the N$_2$ gas introduction was stopped, and sputtering was carried out using a TbDyFeCo type alloy target in Ar gas of 5×10$^{-3}$ Torr. By this, a magnetic layer (Tb$_{10}$Dy$_{17}$Fe$_{68}$Co$_{10}$), which was a perpendicular magnetic layer of TbDyFeCo type, was formed on the first protective layer. The magnetic layer had a thickness of 500 Å (see No. 1 in Table 1).

The target was changed into an Al target while keeping the chamber in vacuum, and then sputtering was carried out. A thermal diffusion layer of Al was formed by the sputtering. The thickness of thermal diffusion layer was 600 Å.

The thus obtained intermediate product was taken out of the sputtering system, and a photoresist was applied onto the thermal diffusion layer, using a spin coater.

The thickness of photoresist was 2 µm. After that, while the pre-baked intermediate product was rotated, it was irradiated by an excimer laser (λ=248 nm). The laser was modulated by a predetermined frequency (standard information). After development and post-baking, a predetermined resist pattern was obtained. The pattern included islands of resist (similar to pits) scattered along the tracks. A single island had a diameter of 0.4 µm. A distance between two adjacent islands was 0.4 µm. Dry etching was next carried out using Ar plasma. The Al layer was removed thereby except for the portion on the islands. Further, silicon nitride (second protective layer) was formed in thickness of 700 Å to protect the magnetic layer (not shown).

With other materials, the record layer was formed in the same manner as described above. Table 1 shows the initialization magnetic field (at 25°), the Curie point, the compensation temperature, and the magnetization inversion temperature (external magnetic field: 300 Oe) for each material. In Table 1, No. 1 has a single layered structure of magnetic layer and No. 2–No. 5 has a double layered structure thereof.

Figure 7:
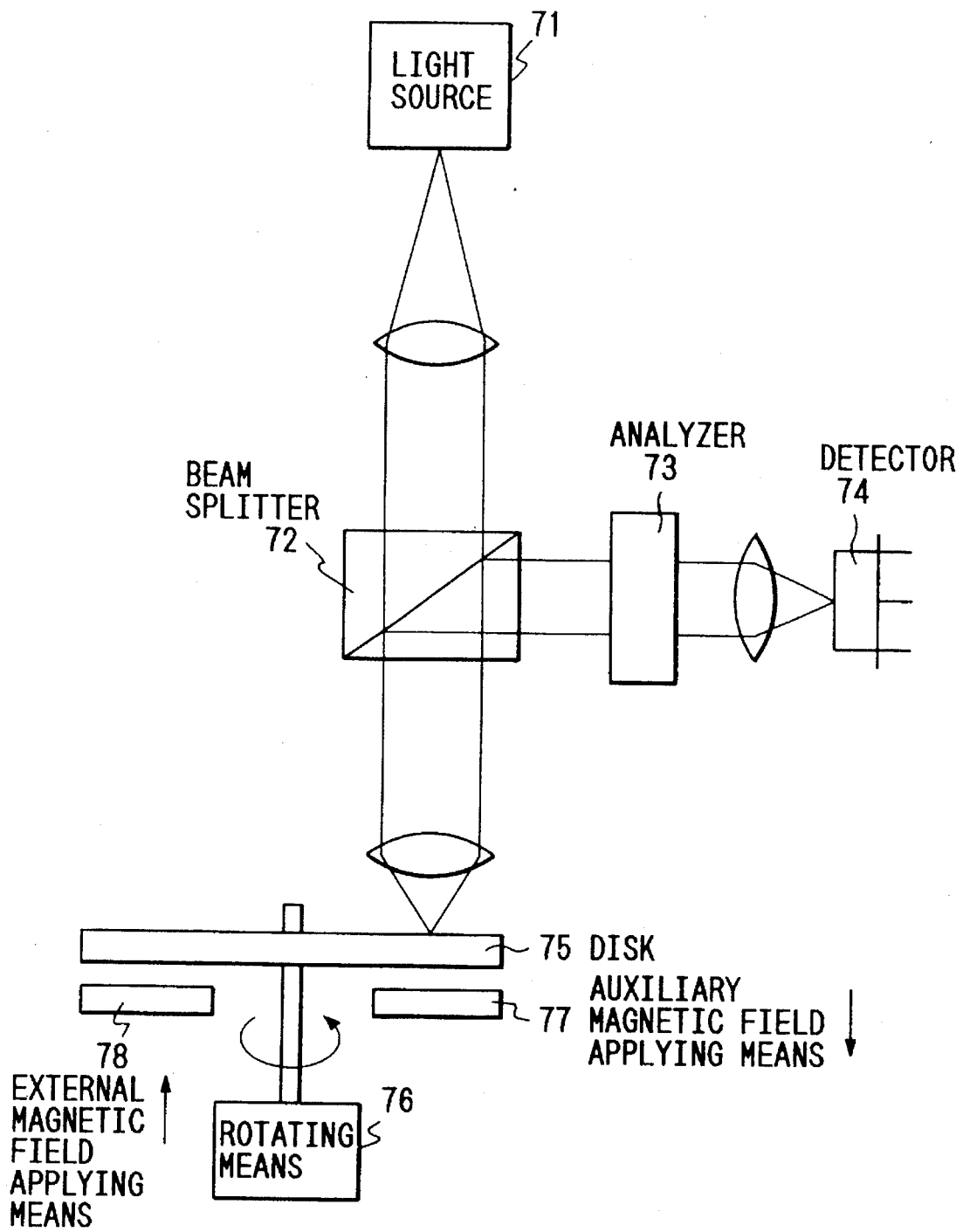
FIG. 7 is a conceptual drawing to show the construction of a reproducing apparatus in an embodiment of the present invention.

[Example 4] (reproducing apparatus: see FIG. 7)

This apparatus is composed, as shown in FIG. 7, mainly of disk rotating means (76), external magnetic field (initialization magnetic field) applying means (78), a laser beam source (71) located downstream of the external magnetic field applying means (78), auxiliary magnetic field applying means (77) located opposite to the laser beam source, and optical processing means located on the same side as the laser beam source. The external magnetic field applying means (78) is a permanent magnet providing a magnetic field of 10 kOe (on the disk surface) in the "A direction" ↑. If a magnetic layer of a disk used has a compensation temperature, the auxiliary magnetic field applying means (77) can also serve as the external magnetic field applying means (78). Therefore, the means (78) may be omitted in that case.

The beam source (71) is a semiconductor laser of λ=780 nm and numerical aperture (NA)=0.55. The (magneto-)optical means is composed of a (polarized or non-polarized) beam splitter (72) disposed between the beam source and the disk, an analyzer (73) and a detector (74).

The disk (75) is rotated by rotating means, and the initialization magnetic field is first applied thereto. This completes the preliminary treatment.

The laser beam is next radiated. The laser beam emitted from the beam source (71) is guided to pass through the beam splitter (72) and then to impinge on the disk (75), and is reflected by the disk. The reflected light is then reflected by the beam splitter (72) toward the analyzer (73) and the detector (74). The analyzer may be a polarization beam splitter. In that case, the light carrying information is split into two beams, which are outgoing from the splitter. The outgoing light beams are converted into electric signals by respectively provided detectors. A signal with high CN ratio can be obtained by taking a difference between the thus converted electric signals.

[Example 5] (reproduction)

The disk in Example 3 is set on the apparatus in Example 4, and then the disk is rotated at 1800 rpm. When the disk passes the vicinity of the external magnetic field applying means, the magnetization in magnetic layer is aligned in the "A direction" ↑ by the magnetic field of 10 kOe. This is the preliminary treatment.

Figures 5A, 5B:
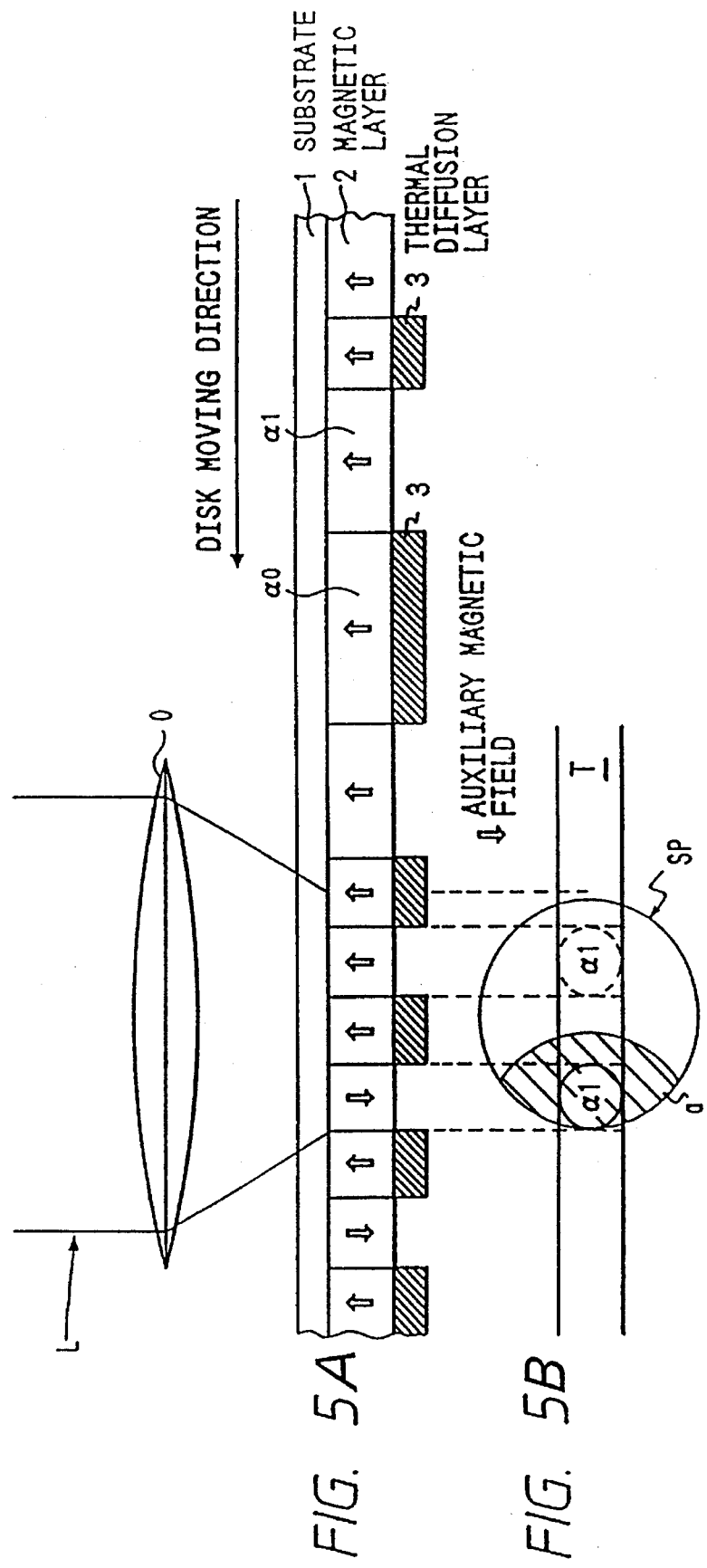
FIGS. 5A and 5B are conceptual drawings showing, respectively, a vertical cross section of a disk in another embodiment of the present invention and a top plan view thereof.

The pre-treated disk soon comes to the irradiation position of the laser beam (linearly polarized light). At the irradiation position, the beam irradiates the magnetic layer to increase the temperature of magnetic layer within the spot thereof (diameter: 1.3 μm). The temperature of the rear end region (a in FIG. 5) of the magnetic layer in the spot reaches a high temperature by the heat storage effect. If a region $\alpha_1$ in which the thermal diffusion layer is not provided adjacent to the magnetic layer is located in the region a at this moment, the heat storage effect is effective to function. Then, the temperature of region $\alpha_1$ exceeds the compensation temperature (Tcomp.) to invert the magnetization into the "inverse A direction" ↓ and further exceeds the predetermined high temperature $T_R$ to considerably lower the coercivity.

The magnetic layer near the spot is under influence of the auxiliary magnetic field of "A direction" ↑ applied by the auxiliary magnetic field applying means. Thus, the direction of magnetization is again inverted in the region $\alpha_1$ into the "A direction" ↑. The heat storage effect is not effective in the region other than the region a in the spot, so that the temperature there does not exceed the predetermined high temperature $T_R$. Therefore, the direction of magnetization is not re-inverted there as kept in ① "A direction" (if the temperature does not exceed Tcomp.) or in ② "inverse A direction" (if the temperature exceeds Tcomp.). Since the Kerr effect is not dependent on the direction of magnetization but mainly on the TM sub-lattice magnetization, either ① or ② will do.

On the other hand, if a region $\alpha_0$ in which the thermal diffusion layer is provided is located in the region a, the heat storage effect is not effective to function. Therefore, the temperature of magnetic layer does not exceed the predetermined high temperature $T_R$ even in the heat-storing region a, so that the direction of magnetization is in ① "A direction" or in ② "inverse A direction". Also, since the heat storage effect is not effective in the region other than the region a in the spot, the temperature there does not exceed the predetermined high temperature $T_R$ and the direction of magnetization is in ① "A direction" or in ② "inverse A direction".

Information is reproduced by processing the beam reflected from the magnetic layer in the (magneto-) optical means.

The above disks were used for reproduction in the reproducing apparatus and the reproducing method as described above, and CN ratios were measured therefor. Table 1 shows the results in measurement, in which various disks were prepared with the magnetic layer being modified as shown in No. 2–No. 5 in Table 1 and the CN ratios were measured therefor.

TABLE 1

| No | Material for mag. layer (thickness) | Tcomp. Curie point [°C.] | Temp. of magnetic inversion [°C.] | Coercivity at room temp. [Oe] | CN ratio [dB] |
| --- | --- | --- | --- | --- | --- |
| 1 | $Tb_{10}Dy_{17}Fe_{63}Co_{10}$ (500 Å) | 120 200 | 170 | 2500 | 43 |
| 2 | $Gd_{23}Fe_{55}Co_{22}$ (200 Å) | None >400 | | | |
|   | $Tb_{10}Dy_{17}Fe_{63}Co_{10}$ (300 Å) | 120 200 | 170 | 2500 | 46 |
| 3 | $Gd_{23}Fe_{55}Co_{22}$ (200 Å) | None >400 | | | |
|   | $Dy_{29}Fe_{41}Co_{30}$ (300 Å) | 140 240 | 210 | 2200 | 46 |
| 4 | $Gd_{23}Fe_{55}Co_{22}$ (200 Å) | None >400 | | | |
|   | $Gd_5Dy_{23}Fe_{41}Co_{31}$ (300 Å) | 150 260 | 230 | 3500 | 45 |
| 5 | $Gd_{23}Fe_{55}Co_{22}$ (200 Å) | None >400 | | | |
|   | $Gd_{21}Tb_7Fe_{60}Co_{12}$ (300 Å) | 150 260 | 230 | 3500 | 45 |

The CN ratios of the magneto-optical disks with various magnetic layers as shown in Table 1 are within a range of 43–46 dB. With conventional magneto-optical disks, reproduction is impossible for a mark smaller than the size of irradiating spot of laser beam. The size of marks ($\alpha_0$ or $\alpha_1$) in the present invention is smaller than that in the conventional disks, so that reproduction would be impossible if the micro regions were not formed with the thermal diffusion layer. The results in Table 1 show that the marks smaller than the irradiating spot of laser beam, with which the reproduction was conventionally impossible, can be reproduced at high CN ratio by provision of the thermal diffusion layer.

[Example 6]

Disks were produced with change of material for the thermal diffusion layer in the same manner as in Example 3, and CN ratios thereof were measured. Table 2 shows the results of measurement.

TABLE 2

| Material for thermal diffusion layer | Thermal conductivity [W/m · K] | Specific heat [J/g · K] | C/N [dB] |
| --- | --- | --- | --- |
| Al | 240 | 0.9 | 43 |
| Dy | 9 | 0.17 | 10 |
| Cu | 400 | 0.4 | 43 |
| Ge | 67 | 0.31 | 39 |
| Ta | 57 | 0.15 | 32 |

As the thermal conductivity of the thermal diffusion layer becomes greater than that of the magnetic layer, a difference of thermal conductivity from the magnetic layer increases. Accordingly, a temperature difference increases in the magnetic layer within the spot irradiated by the laser beam between the first micro region $\alpha_0$ in which the thermal diffusion layer is provided and the second micro region $\alpha_1$ in which the thermal diffusion layer is not provided. Because of that, the inversion of magnetization becomes clearer to provide a high CN ratio. If the thermal diffusion layer has a too small specific heat, a small heat quantity would make the layer saturated even if the thermal conductivity thereof is sufficiently large. This reduces the temperature difference in the magnetic layer between $\alpha_0$ and $\alpha_1$. Increasing the specific heat of the thermal diffusion layer can increase the temperature difference in the magnetic layer between $\alpha_0$ and $\alpha_1$, whereby the CN ratio can be enhanced.

[Example 7] (disk with diamond thin layer)

(1) A 2P substrate in Example 1 was prepared.

(2) An RF magnetron sputtering system was prepared, and the 2P substrate and various targets were set in the chamber of the system. Once the chamber was evacuated to the degree of vacuum of not more than $7 \times 10^{-7}$ Torr, Ar gas was introduced to $5 \times 10^{-3}$ Torr.

Reactive sputtering was first carried out, using a Si target and introducing $N_2$ gas into the chamber in addition to the Ar gas, to form silicon nitride (first protective layer) in thickness of 700 Å on a resin layer.

The $N_2$ gas introduction was then stopped, and sputtering was carried out using a TbGdFeCo type alloy target in Ar gas of $5 \times 10^{-3}$ Torr. By this sputtering, a magnetic layer ($Tb_4Gd_{23}Fe_{63}Co_{10}$), which was the perpendicular magnetic layer of TbGdFeCo type, was formed on the first protective layer. The magnetic layer had a thickness of 500 Å.

The thus obtained intermediate product was then taken out of the sputtering system and set in a CVD system. After the CVD system was evacuated to vacuum, methane gas was introduced thereinto, and a diamond thin layer was formed by CVD in thickness of 800 Å.

The obtained intermediate product was taken out of the CVD system, and was set in an exposure apparatus. Rotating the intermediate product and a reticle with predetermined pattern, the diamond thin layer was irradiated by an excimer laser ($\lambda$=192 nm) with blow of oxygen gas. The laser was radiated at a frequency of 100 Hz. This removed the diamond thin layer in the laser irradiating portion, whereby a pattern was formed in the diamond layer. The pattern was formed as island-like pits scattered along tracks. A single island had a diameter of 0.4 μm. A distance between two adjacent islands was 0.4 μm.

Further, silicon nitride (second protective layer) was formed in thickness of 700 Å to protect the magnetic layer. Thus, the disk of the present example was produced.

Other disks were produced with changing the material for magnetic layer in the same manner. Table shows compositions of magnetic layer, coercivities (at room temperature= 25° C.), Curie temperatures, compensation temperatures, and magnetization inversion temperatures (external magnetic field: 1 kOe) of the disks.

TABLE 3

| Magnetic layer | Coercivity [kOe] | Curie point [°C.] | Tcomp. [°C.] | Temp. of magnetic inversion [°C.] | CN ratio [dB] |
| --- | --- | --- | --- | --- | --- |
| $Tb_4Gd_{23}Fe_{63}Co_{10}$ | 0.8 | 280 | 130 | 180 | 45 |
| $Gd_{27}Fe_{64}Co_9$ | 0.2 | 300 | 110 | 160 | 43 |
| $Dy_7Gd_{20}Fe_{64}Co_9$ | 0.5 | 260 | 120 | 170 | 46 |

Figure 6:
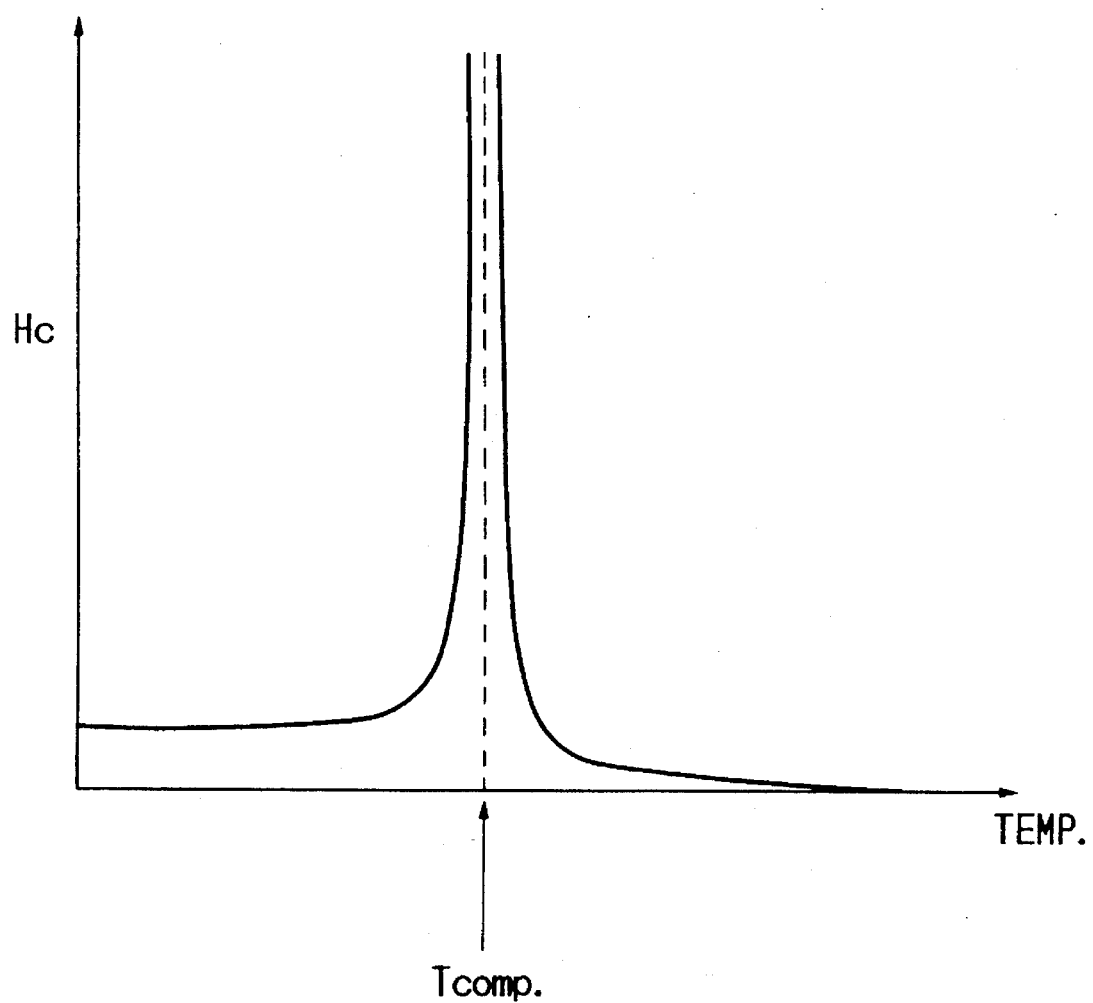
FIG. 6 is a graph to show the temperature dependency of coercivity of a magnetic layer having a compensation temperature.

Either of the magnetic layers has the temperature dependency of coercivity as shown in FIG. 6. The magnetic layer is RE rich near the room temperature and the coercivity is slightly lower than 1 kOe. The compensation temperature (Tcomp.) is between the room temperature and the Curie temperature. The magnetic layer becomes TM rich over the compensation temperature and the coercivity suddenly drops.

[Example 8] (reproducing apparatus)

This apparatus is composed mainly of disk rotating means, a laser beam source, auxiliary magnetic field applying means (also serving as external magnetic field applying means) located opposite to the beam source, and magneto-optical processing means located on the same side as the beam source. The auxiliary magnetic field applying means is a permanent magnet providing a magnetic field of 1 kOe (on the disk surface) in the "A direction". The light source is a semiconductor laser of $\lambda$=780 nm and numerical aperture (NA)=0.55. The magneto-optical means is comprised of a (polarized or non-polarized) beam splitter disposed between the light source and the disk, an analyzer and a detector. The disk is rotated by the rotating means and is exposed to the auxiliary magnetic field before irradiation.

[Example 9] (reproduction)

The disk in Example 7 is set on the apparatus in Example 8, and the disk is rotated at 1800 rpm. When a portion in the magnetic layer comes to the irradiation position of laser beam (linearly polarized light), the magnetization in the portion of magnetic layer is aligned in the "A direction" by the auxiliary magnetic field of 1 kOe. At the laser beam irradiation position, the magnetic layer is irradiated by the beam to increase the temperature thereof in the spot (diameter: 1.3 μm). Then, the magnetic layer exceeds the compensation temperature, so that the magnetization thereof is inverted into the "inverse A direction".

The rear end region (the region a in FIG. 4) in the spot increases its temperature by the heat storage effect. If a region $\alpha_1$ to which the diamond thin layer is not adjacent is located in the region A in this case, the heat storage effect is effective to function. Thus, the temperature of region $\alpha_1$ reaches the predetermined high temperature $T_R$, whereby the coercivity steeply drops. The auxiliary magnetic field of "A direction" is present near this region. The magnetization of region $\alpha_1$ is re-inverted into the "A direction" by the auxiliary magnetic field. The portion other than the region a in the spot has no heat storage effect, so that the temperature thereof does not reach the high temperature $T_R$. Thus, the coercivity there hardly decreases. Accordingly, the direction of magnetization is not re-inverted by the auxiliary magnetic field of "A direction" but is kept in the "inverse A direction". In the spot, the magnetization is in the "A direction" in part while in the "inverse A direction" in the remainder.

On the other hand, if a region $\alpha_0$ to which the diamond thin layer is adjacent is located in the region a, the heat storage effect is not effective to function. Thus, the temperature of region $\alpha_0$ does not reach the predetermined high temperature $T_R$, so that the coercivity hardly decreases. Accordingly, the direction of magnetization is not re-inverted by the auxiliary magnetic field of "A direction" but is kept in the "inverse A direction". Since the region other than the region a in the spot does not have the heat storage effect, the temperature thereof does not reach the high temperature $T_R$, of course. Thus, the direction of magnetization there is kept in the "inverse A direction". Therefore, the magnetization is in the "inverse A direction" in the entire region in the spot. Information can be reproduced by processing the beam reflected from the magnetic layer by the (magneto-optical) means.

Measured CN ratios are shown in above Table 3.

Disks with different thicknesses of diamond thin layer were made in the same manner, and were used for reproduction by the above reproducing apparatus and reproducing method. Table 4 shows the results of measurement of CN ratio.

TABLE 4

| Thickness of diamond layer [Å] | CN ratio [dB] |
|---|---|
| 100 | 28 |
| 300 | 36 |
| 500 | 44 |
| 800 | 45 |
| 1000 | 46 |

From the results of Table 3, the CN ratios of magneto-optical disks with various magnetic layers are within a range of 43–46 dB. In case of the conventional magneto-optical disks, reproduction is impossible for a mark smaller than the size of irradiating spot of laser beam. Since the size of marks ($\alpha_1$, $\alpha_0$) in the present invention is smaller than that in the conventional disks, reproduction would be impossible if the micro regions were not formed by the diamond thin layer. The results of Table 3 show that the marks smaller than the irradiation spot of laser beam, with which reproduction was conventionally impossible, can be reproduced at high CN ratio by provision of the layer of diamond thin film.

Also, the results of Table 4 show that the CN ratio becomes higher as the thickness of diamond thin layer increases and that the performance is almost identical above 500 Å.

Figure 8A:
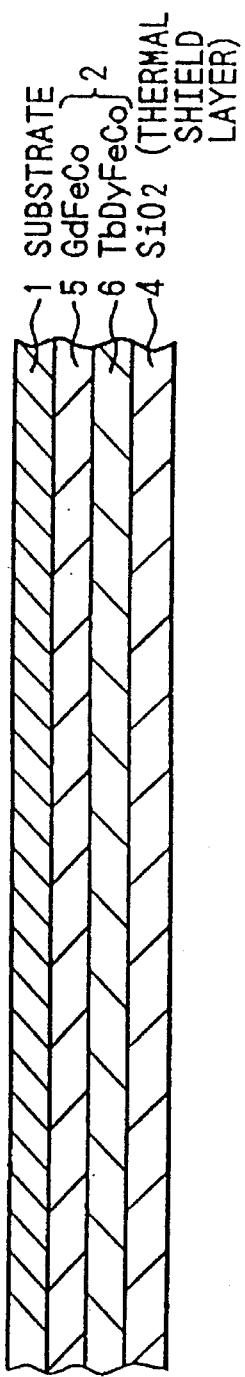
FIG. 8 is a conceptual drawing to show vertical cross sections of a disk or a semiprocessed disk in another embodiment of the present invention.
Figure 8B:
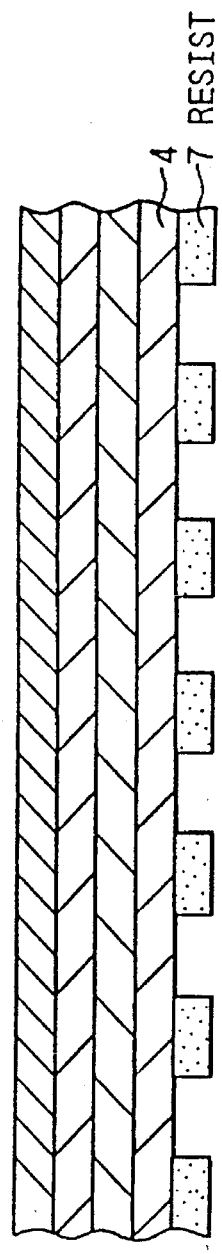
Figure 8C:
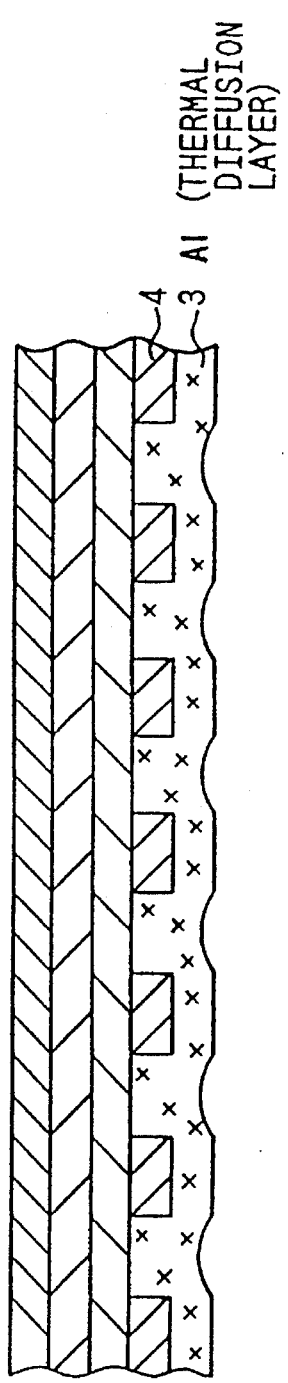

[Example 10] (disk with thermal shield layer: see FIG. 8)

(1) A 2P substrate in Example 1 was prepared.

(2) An RF magnetron sputtering system was prepared, and the 2P substrate and various targets were set in a chamber of this system.

Once the chamber was evacuated to the degree of vacuum of not more than $7\times10^{-7}$ Torr, and Ar gas was introduced to $5\times10^{-3}$ Torr.

Reactive sputtering was first carried out using a Si target and introducing $N_2$ gas into the chamber in addition to the Ar gas, so that silicon nitride (first protective layer: not shown) was formed in thickness of 700 Å on a resin layer.

The $N_2$ gas introduction was then stopped, and sputtering was carried out using a GdFeCo type alloy target in Ar gas of $5\times10^{-3}$ Torr. By this, a first magnetic layer $Gd_{22}Fe_{55}Co_{23}$ (5), which was the perpendicular magnetic layer of GdFeCo type, was formed on the first protective layer. Further, sputtering was carried out using a TbDyFeCo type alloy target. A second magnetic layer $Tb_{10}Dy_{16}Fe_{64}Co_{10}$ (6) was formed on the $Gd_{22}Fe_{55}Co_{23}$ layer by the sputtering. The thickness of the first magnetic layer (5) was 500 Å and the thickness of the second magnetic layer (6) was 300 Å. The two layers constitute the "magnetic layer"(2).

A $SiO_2$ layer was formed as the thermal shield layer (4) in thickness of 500 Å on the second magnetic layer.

The obtained intermediate product (see FIG. 8A) was taken out of the sputtering system, and thereafter a photoresist was applied onto the thermal shield layer, using a spin coater. The thickness of photoresist was 1 μm. After that, the pre-baked intermediate product was irradiated by an excimer laser ($\lambda$=248 nm) while being rotated. The laser was modulated by a predetermined frequency (standard information). After development and post-baking, a predetermined resist pattern was obtained. The pattern was where islands (7) of resist (corresponding to pits) were scattered along tracks (see FIG. 8B). A single island had a diameter of 0.4 μm. A distance between two adjacent islands was 0.4 μm.

Dry etching was next carried out using Ar plasma. This removed $SiO_2$ on the portion other than the islands.

The thus obtained product was again set in the sputtering system, and after an Al target was set, sputtering was carried out. A thermal diffusion layer (3) of Al was formed by the sputtering (see FIG. 8C). The thickness of the thermal diffusion layer (3) was 500 Å.

A CN ratio was measured for this magneto-optical disk.

[Example 11] (reproducing apparatus)

This apparatus is the same as that in FIG. 7, which is composed mainly of disk rotating means (76), external magnetic field applying means (78), a laser beam source (71) located downstream of the means (78), auxiliary magnetic field applying means (77) located opposite to the light source (71), and magneto-optical processing means located on the same side as the light source (71).

The external magnetic field applying means (78) is a permanent magnet providing a magnetic field of 10 kOe (on the disk surface) in the "A direction"↑. The auxiliary magnetic field applying means (77) is a permanent magnet providing a magnetic field of 300 Oe (on the disk surface) in the "inverse A direction"↓. The light source (71) is a semiconductor laser of $\lambda$=780 nm and numerical aperture (NA)=0.55. The (magneto-) optical means is composed of a (polarized or non-polarized) beam splitter (72) disposed between the light source and the disk, an analyzer (73) and a detector (74).

The disk (75) is rotated by the rotating means (67), and the external magnetic field was first applied thereto. The magnetization is aligned into the "A direction"↑ before the beam irradiation. This completes the preliminary treatment.

The laser beam is then radiated. The beam emitted from the light source is guided to pass through the beam splitter (or possibly to be reflected thereby, contrary to FIG. 8) and to impinge on the disk, and is then reflected by the disk (or possibly passes through the disk, contrary to FIG. 8). The reflected light is again reflected by the beam splitter toward the analyzer and the detector.

[Example 12] (reproduction)

The disk in Example 10 is set on the apparatus in Example 11, and the disk is rotated at 1800 rpm. In the disk near the external magnetic field applying means, the magnetization of magnetic layer is subject to the magnetic field of 10 kOe so as to be aligned into the "A direction"↑. This is the preliminary treatment.

The pre-treated disk soon comes to the irradiation position of laser beam (linearly polarized light). At the irradiation position, the magnetic layer is irradiated by the beam, so that the temperature of magnetic layer in the spot (diameter: 1.3 µm) increases. In the spot, the rear end region (corresponding to the heat-storing region a in FIG. 4) in particular reaches a high temperature because of the heat storage effect. In this case, if a region $\alpha_1$ to which the thermal shield layer is adjacent is located in the heat-storing region a, the heat storage effect is effective to function, because the heat dissipation is little. Thus, the temperature of region $\alpha_1$ reaches the predetermined high temperature $T_R$, and the coercivity steeply drops. The auxiliary magnetic field of "inverse A direction"↓ is present near the region.

Then, the magnetization of region $\alpha_1$ is inverted into the "inverse A direction"↓. The region other than the region a in the spot does not have the heat storage effect, and therefore the temperature thereof does not reach the high temperature $T_R$. For that, the coercivity hardly drops. Accordingly, when the region is subject to the auxiliary magnetic field of "inverse A direction"↓, the magnetization is not inverted but is kept in the "A direction"↑. Therefore, the magnetization is in the "inverse A direction"↓ in a portion (region a) in the spot while in the "A direction"↑ in the remaining region.

On the other hand, if a region $\alpha_0$ to which the thermal shield layer is not adjacent is located in the region a, the heat storage effect is not effective to function, because the heat dissipation is great. Thus, the temperature of region $\alpha_0$ does not reach the predetermined high temperature $T_R$, and the coercivity hardly drops. Accordingly, when the region is subject to the auxiliary magnetic field of "inverse A direction"↓, the magnetization is not inverted therein but is kept in "A direction"↑. Of course, since the region other than the region a in the spot does not have the heat storage effect, the temperature thereof does not reach the high temperature $T_R$. Thus, the direction of magnetization is kept in the "A direction"↑. The entire region in the spot is kept in the "A direction"↑.

Information can be reproduced by processing the beam reflected from the magnetic layer by the (magneto-) optical means.

The measured CN ratio was 43 dB.

In the disk in Example 10, the thermal diffusion layer is adjacent to the first micro region $\alpha_0$ to which the thermal shield layer is not adjacent. Because of the arrangement, a thermal conductivity (in other words, a dissipation amount) of the second micro region $\alpha_1$ adjacent to the thermal shield layer is greatly different from that of the first micro region $\alpha_0$ (adjacent to the thermal diffusion layer) to which the thermal shield layer is not adjacent. Accordingly, the temperature difference becomes larger in the magnetic layer located at the heat-storing region a, providing an excellent CN ratio. The thermal diffusion layer may be omitted if desired.

[Example 13]

Disks were produced in the same manner as in Example 10 except that the material for thermal shield layer was replaced, and CN ratios thereof were measured. Table 5 shows the results of the measurement.

TABLE 5

| Material for thermal shield layer | Thermal conductivity [W/m · K] | CN ratio [dB] |
| --- | --- | --- |
| SiN | 2 | 43 |
| SiO$_2$ | 1.4 | 44 |
| Dy | 9 | 15 |

[Example 14]

Disks were produced in the same manner as in Example 10 except that the material for thermal diffusion layer was replaced, and CN ratios thereof were measured. Table 6 shows the results of the measurement.

TABLE 6

| Material for thermal diffusion layer | Thermal conductivity [W/m · K] | CN ratio [dB] |
| --- | --- | --- |
| Al | 240 | 43 |
| Dy | 9 | 10 |
| Cu | 400 | 43 |
| Ge | 67 | 39 |
| Ta | 57 | 32 |
| Reference | | |
| TbFeCo | 20 | |

When Cu, Ge or Ta is used as the material for thermal diffusion layer, small marks which could not be conventionally reproduced can be reproduced at CN ratio of not less than 30 dB.

As described above, the present invention provides a magneto-optical disk for exclusive use of reproduction, by which magnetic super resolution is obtainable with an arrangement in which the high temperature region a decreasing the coercivity of magnetic layer is formed in a portion of the laser beam spot. The disk of the present invention utilizes this phenomenon to detect an information unit (corresponding to a mark) of the micro region $\alpha_1$, $\alpha_1$ smaller than the spot diameter of beam for reproduction, conventionally unable to be reproduced. Therefore, the disk of the present invention has a high record density and a large storage capacity.

Also, no trouble is caused with the disk of the present invention even if the direction of magnetization is disturbed in the magnetic layer because of erroneous application of too strong magnetic field or of abnormally high temperature. The information reproduction becomes possible after the preliminary treatment as described.

Further, the multi-layered structure of the magnetic layer can increase the Kerr rotation angle at a high temperature (temperature upon reproduction), whereby a higher CN ratio may be attained. In addition, a higher CN ratio can be obtained by using a substance with high thermal conductivity for the thermal diffusion layer.

We claim:

1. A read-only magneto-optical disk comprising at least a substrate and a magnetic layer built up thereon, wherein a first micro region $\alpha_0$ and a second micro region $\alpha_1$ are formed along a track in said magnetic layer, said first and second micro regions have a same direction of magnetization prior to information reproduction from the disk, the direction of magnetization of said second micro region is changed to a predetermined direction under predetermined irradiation of a laser beam for reproduction and the direction of magnetization of the first micro region is not changed to said predetermined direction under said predetermined irradiation and wherein, defining one of said micro regions as an information unit, information is expressed by presence or absence of the information unit or by a length thereof.

2. A read-only magneto-optical disk comprising at least a substrate and a magnetic layer built up thereon, wherein a first micro region $\alpha_0$ on which a thermal diffusion layer is provided and a second micro region $\alpha_1$ on which said thermal diffusion layer is not provided are formed along a track in said magnetic layer and wherein, defining one of said micro regions as an information unit, information is expressed by presence or absence of the information unit or by a length thereof.

3. A read-only magneto-optical disk comprising at least a substrate and a magnetic layer built up thereon, wherein a second micro region $\alpha_1$ on which a thermal shield layer is provided and a first micro region $\alpha_0$ on which said thermal shield layer is not provided are formed along a track in said magnetic layer and wherein, defining one of said micro regions as an information unit, information is expressed by presence or absence of the information unit or by a length thereof.

4. A read-only magneto-optical disk according to claim 3, wherein a thermal diffusion layer is provided on said magnetic layer at the first micro region $\alpha_0$ on which said thermal shield layer is not provided.

5. A read-only magneto-optical disk according to claim 2 or claim 4, wherein said thermal diffusion layer is made of material having a thermal conductivity not less than 50 W/m.K.

6. A read-only magneto-optical disk according to claim 2 or claim 4, wherein said thermal diffusion layer is made of material having a specific heat greater than 0.2 J/g.K.

7. A read-only magneto-optical disk according to claim 3 or claim 4, wherein said thermal diffusion layer is a diamond thin layer.

8. A read-only magneto-optical disk according to claim 7, wherein a thickness of said diamond thin layer is not less than 500 Å.

9. A read-only magneto-optical disk according to claim 3 or claim 4, wherein said thermal shield layer is made of material having a thermal conductivity not more than 4 W/m.K.

10. A read-only magneto-optical disk according to any one of claim 1–claim 4, wherein said magnetic layer has perpendicular magnetic anisotropy.

11. A read-only magneto-optical disk according to any one of claim 1–claim 4, wherein a coercivity of said magnetic layer is not more than 4 kOe.

12. A read-only magneto-optical disk according to any one of claim 1–claim 1–claim 4, wherein a compensation temperature of said magnetic layer is not less than room temperature and not more than a Curie point thereof.

13. A read-only magneto-optical disk according to any one of claim 1–claim 4, wherein when said magnetic layer locally reaches a predetermined high temperature $T_R$ by heat storage effect under irradiation of laser beam for reproduction, and a compensation temperature of said magnetic layer is not less than room temperature, not more than said high temperature $T_R$, and not more than a Curie point thereof.

14. A read-only magneto-optical disk according to any one of claim 1–claim 4, wherein a compensation temperature of said magnetic layer is not less than room temperature and not more than 200° C.

15. A read-only magneto-optical disk according to any one of claim 1–claim 4, wherein said magnetic layer is made of GdFeCo or GdTbFeCo or GdDyFeCo.

16. A read-only magneto-optical disk according to any one of claim 1–claim 4, wherein said magnetic layer is composed of at least two layers arranged in order in an irradiation direction of laser beam, for reproduction the first layer having a relatively high Curie point and the second layer having a relatively low Curie point, and wherein the two layers are exchange-coupled with each other in substantially their entire contact region.

17. A magneto-optical reproducing method comprising:

providing a read-only magneto-optical disk including at least a substrate and a magnetic layer built up thereon, wherein a first micro region $\alpha_0$ and a second micro region $\alpha_1$ are formed along a track in said magnetic layer, said first and second micro regions have a same direction of magnetization prior to information reproduction from the disk, the direction of magnetization of said second micro region is changed to a predetermined direction under predetermined irradiation of a laser beam for reproduction and the direction of magnetization of the first micro region is not changed to said predetermined direction under said predetermined irradiation, and wherein, defining one of said micro regions as an information unit, information is expressed by presence or absence of the information unit or by a length thereof;

if a direction of magnetization in said first micro region $\alpha_0$ and a direction of magnetization in said second micro region $\alpha_1$ are different from each other, aligning them in the same direction;

rotating said disk, and irradiating the disk along said track with said predetermined laser beam irradiation to produce a local region on the track located within a spot diameter of said beam, such that when the second micro region $\alpha_1$ is located in said local region the second micro region $\alpha_1$ reaches a predetermined high temperature $T_R$ and magnetization thereof is changed to said predetermined direction, and when the first micro region $\alpha_0$ is located in said local region magnetization thereof is not changed to said predetermined direction; and optically processing reflected light which is light of the laser beam spot reflected from the disk, or transmitted light which is light of the laser beam spot transmitted through the disk, to convert it into an electric signal.

18. A reproducing apparatus for a read-only magneto-optical disk having at least a substrate and a magnetic layer built up thereon, wherein a first micro region $\alpha_0$ and a second micro region $\alpha_1$ are formed along a track in said magnetic layer, said first and second micro regions have a same direction of magnetization prior to information reproduction from the disk, the direction of magnetization of said second micro region is changed to a predetermined direction under predetermined irradiation of a laser beam for reproduction and the direction of magnetization of the first micro region is not changed to said predetermined direction under said predetermined irradiation, and wherein, defining one of said micro regions as an information unit, information is expressed by presence or absence of the information unit or by a length thereof, said reproducing apparatus comprising:

disk rotating means, a laser beam source and an irradiation optical system for irradiating said disk with said predetermined irradiation, auxiliary magnetic field applying means for causing magnetization of said second micro region $\alpha_1$ to change to said predetermined direction under said predetermined irradiation, optical processing means for processing reflected light which is light of said laser beam reflected from the disk, or transmitted light which is light of said laser beam transmitted through the disk, and an optical system for guiding the light to the optical processing means.

19. A read-only magneto-optical disk comprising at least a substrate and a magnetic layer built up thereon, wherein a first micro region $\alpha_0$ and a second micro region $\alpha_1$ are formed along a track in said magnetic layer, a material composition of said first micro region is different from a material composition of said second micro region, and wherein, defining one of said micro regions as an information unit, information is expressed by presence or absence of the information unit or by a length thereof.

20. A reproducing apparatus for a read-only magneto-optical disk having at least a substrate and a magnetic layer built up thereon, wherein a first micro region $\alpha_0$ and a second micro region $\alpha_1$ are formed along a track in said magnetic layer, said first and second micro regions have a same direction of magnetization prior to information reproduction from the disk, the direction of magnetization of said second micro region is changed to a predetermined direction under predetermined irradiation of a laser beam for reproduction and the direction of magnetization of the first micro region is not changed to said predetermined direction under said predetermined irradiation, and wherein, defining one of said micro regions as an information unit, information is expressed by presence or absence of the information unit or by a length thereof, said reproducing apparatus comprising:

disk rotating means, a laser beam source and an irradiation optical system for irradiating said disk with said predetermined irradiation, external magnetic field applying means for aligning directions of magnetization of said first micro region $\alpha_0$ and said second micro region $\alpha_1$, optical processing means for processing reflected light which is light of said laser beam reflected from the disk, or transmitted light which is light of said laser beam transmitted through the disk, and an optical system for guiding the light to the optical processing means.

21. A magneto-optical reproducing method comprising:

providing a read-only magneto-optical disk including at least a substrate and a magnetic layer built up thereon, wherein a first micro region $\alpha_0$ on which a thermal diffusion layer is provided adjacent thereto and a second micro region $\alpha_1$ on which said thermal diffusion layer is not provided are formed along a track in said magnetic layer and wherein, defining one of said micro regions as an information unit, information is expressed by presence or absence of the information unit or by a length thereof;

if a direction of magnetization in said first micro region $\alpha_0$ and a direction of magnetization in said second micro region $\alpha_1$ are different from each other, aligning them in the same direction;

rotating said disk, and irradiating the disk along said track with a laser beam for reproduction to produce a local region on the track within a spot diameter of said beam, such that when the second micro region $\alpha_1$ is located in said local region the second micro region $\alpha_1$ reaches a predetermined high temperature $T_R$ and magnetization thereof is changed to a predetermined direction, and when the first micro region $\alpha_0$ is located in said local region magnetization thereof is not changed to said predetermined direction; and optically processing reflected light which is light of the laser beam spot reflected from the disk, or transmitted light which is light of the laser beam spot transmitted through the disk, to convert it into an electric signal.

22. A magneto-optical reproducing method comprising:

providing a read-only magneto-optical disk including at least a substrate and a magnetic layer built up thereon, wherein a second micro region $\alpha_1$ on which a thermal shield layer is provided adjacent thereto and a first micro region $\alpha_0$ on which said thermal shield layer is not provided are formed along a track in said magnetic layer and wherein, defining one of said micro regions as an information unit, information is expressed by presence or absence of the information unit or by a length thereof;

if a direction of magnetization in said first micro region $\alpha_0$ and a direction of magnetization in said second micro region $\alpha_1$ are different from each other, aligning them in the same direction;

rotating said disk, and irradiating the disk along said track with a laser beam for reproduction to produce a local region on the track within a spot diameter of said beam, such that when the second micro region $\alpha_1$ is located in said local region the second micro region $\alpha_1$ reaches a predetermined high temperature $T_R$ and magnetization thereof is changed to a predetermined direction, and when the first micro region $\alpha_0$ is located in said local region magnetization thereof is not changed to said predetermined direction; and optically processing reflected light which is light of the laser beam spot reflected from the disk, or transmitted light which is light of the laser beam spot transmitted through the disk, to convert it into an electric signal.

23. A method according to claim 22, wherein a thermal diffusion layer is provided on said magnetic layer at the first micro region $\alpha_0$.

24. A reproducing apparatus for a read-only magneto-optical disk having at least a substrate and a magnetic layer built up thereon, wherein a first micro region $\alpha_0$ on which a thermal diffusion layer is provided adjacent thereto and a second micro region $\alpha_1$ on which said thermal diffusion layer is not provided are formed along a track in said magnetic layer and wherein, defining one of said micro regions as an information unit, information is expressed by presence or absence of the information unit or by a length thereof, said reproducing apparatus comprising:

disk rotating means, a laser beam source, an irradiation optical system for irradiating said disk with a laser beam from said laser beam source, auxiliary magnetic field applying means for causing magnetization of said second micro region $\alpha_1$ to change to a predetermined direction under irradiation of said laser beam, optical processing means for processing reflected light which is light of said laser beam reflected from the disk, or transmitted light which is light of said laser beam transmitted through the disk, and an optical system for guiding the light to the optical processing means.

25. A reproducing apparatus for a read-only magneto-optical disk having at least a substrate and a magnetic layer built up thereon, wherein a second micro region $\alpha_1$ on which a thermal shield layer is provided adjacent thereto and a first micro region $\alpha_0$ on which said thermal shield layer is not provided are formed along a track in said magnetic layer and wherein, defining one of said micro regions as an information unit, information is expressed by presence or absence of the information unit or by a length thereof, said reproducing apparatus comprising:

disk rotating means, a laser beam source, an irradiation optical system for irradiating said disk with a laser beam from said laser beam source, auxiliary magnetic field applying means for causing magnetization of said second micro region $\alpha_1$ to change to a predetermined direction under irradiation of said laser beam, optical processing means for processing reflected light which is light of said laser beam reflected from the disk, or transmitted light which is light of said laser beam transmitted through the disk, and an optical system for guiding the light to the optical processing means.

26. A reproducing apparatus according to claim 25, wherein a thermal diffusion layer is provided on said magnetic layer at the first micro region $\alpha_0$.

27. A reproducing apparatus for a read-only magneto-optical disk having at least a substrate and a magnetic layer built up thereon, wherein a first micro region $\alpha_0$ on which a thermal diffusion layer is provided adjacent thereto and a second micro region $\alpha_1$ on which said thermal diffusion layer is not provided are formed along a track in said magnetic layer and wherein, defining one of said micro regions as an information unit, information is expressed by presence or absence of the information unit or by a length thereof, said reproducing apparatus comprising:

disk rotating means, a laser beam source, an irradiation optical system for irradiating said disk with a laser beam from said laser beam source, external magnetic field applying means for aligning directions of magnetization of said first micro region $\alpha_0$ and said second micro region $\alpha_1$, optical processing means for processing reflected light which is light of said laser beam reflected from the disk, or transmitted light which is light of said laser beam transmitted through the disk, and an optical system for guiding the light to the optical processing means.

28. A reproducing apparatus for a read-only magneto-optical disk having at least a substrate and a magnetic layer built up thereon, wherein a second micro region $\alpha_1$ on which a thermal shield layer is provided adjacent thereto and a first micro region $\alpha_0$ on which said thermal shield layer is not provided are formed along a track in said magnetic layer and wherein, defining one of said micro regions as an information unit, information is expressed by presence or absence of the information unit or by a length thereof, said reproducing apparatus comprising:

disk rotating means, a laser beam source, an irradiation optical system for irradiating said disk with a laser beam from said laser beam source, external magnetic field applying means for aligning directions of magnetization of said first micro region $\alpha_0$ and said second micro region $\alpha_1$, optical processing means for processing reflected light which is light of said laser beam reflected from the disk, or transmitted light which is light of the laser beam transmitted through the disk, and an optical system for guiding the light to the optical processing means.

29. A method according to claim 28, wherein a thermal diffusion layer is provided on said magnetic layer at the first micro region $\alpha_0$.

30. A read-only magneto-optical disk according to claim 1, wherein a material composition of said first micro region is different from a material composition of said second micro region.

31. A reproducing apparatus according to claim 18, claim 24, claim 25 or claim 26, further comprising external magnetic field applying means for aligning directions of magnetization in the first micro region $\alpha_0$ and in the second micro region $\alpha_1$ of said disk.

* * * * *